July 11, 1961  C. A. WILMS  2,991,813
PITTING AND STUFFING MACHINE
Filed May 31, 1956  5 Sheets-Sheet 4
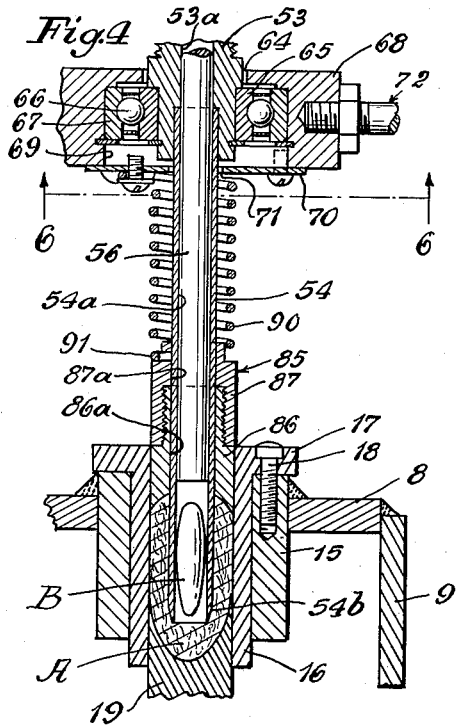
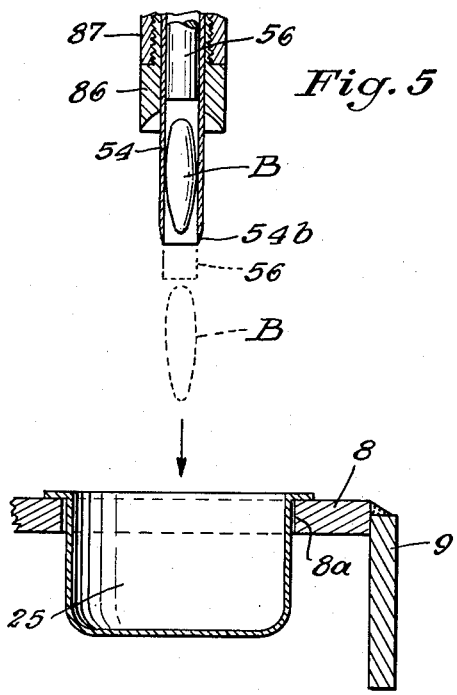
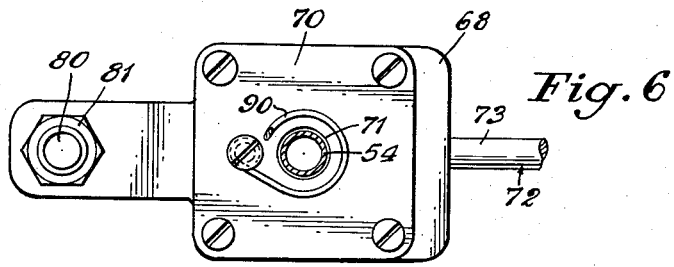
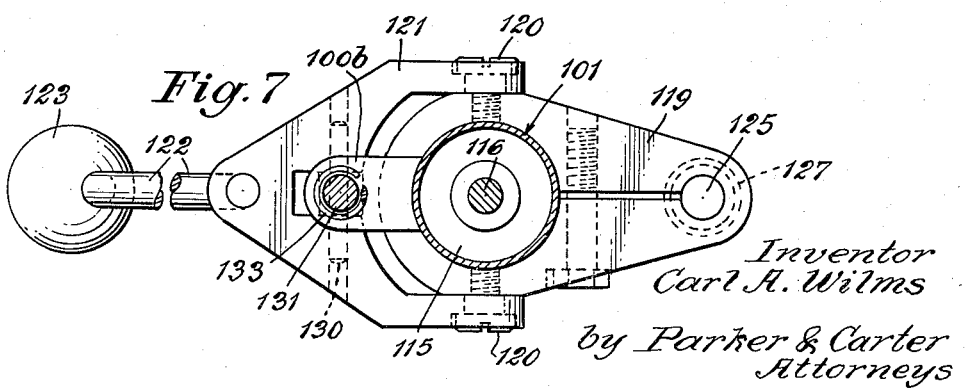
Inventor
Carl A. Wilms
by Parker & Carter
Attorneys July 11, 1961  C. A. WILMS  2,991,813
PITTING AND STUFFING MACHINE
Filed May 31, 1956  5 Sheets-Sheet 5
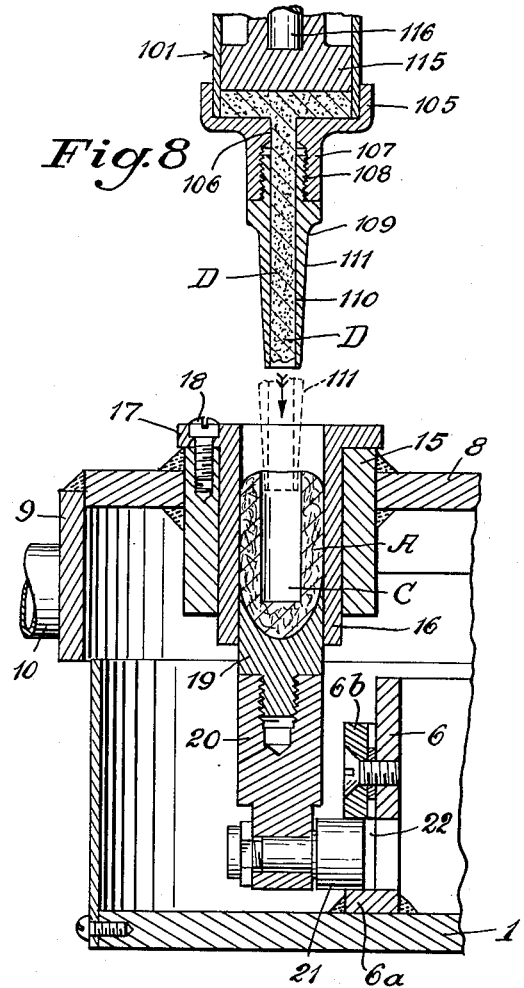
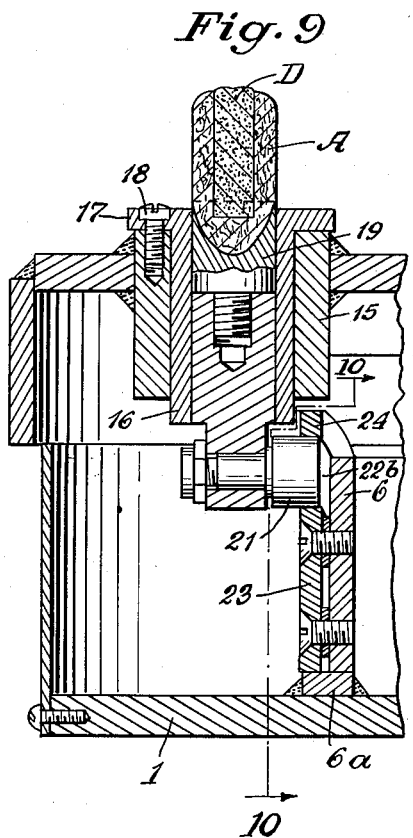
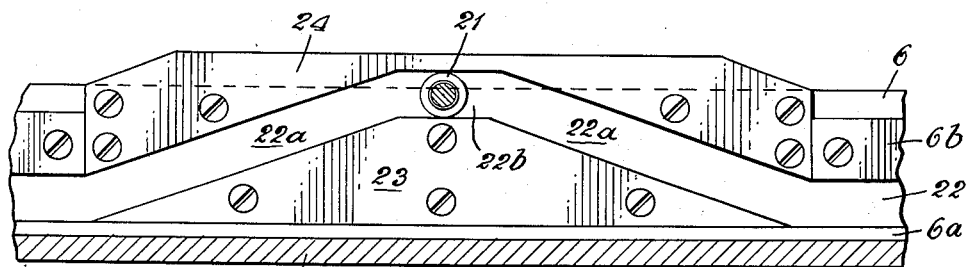
Inventor
Carl A. Wilms
by Parker & Carter
Attorneys

United States Patent Office 2,991,813
Patented July 11, 1961

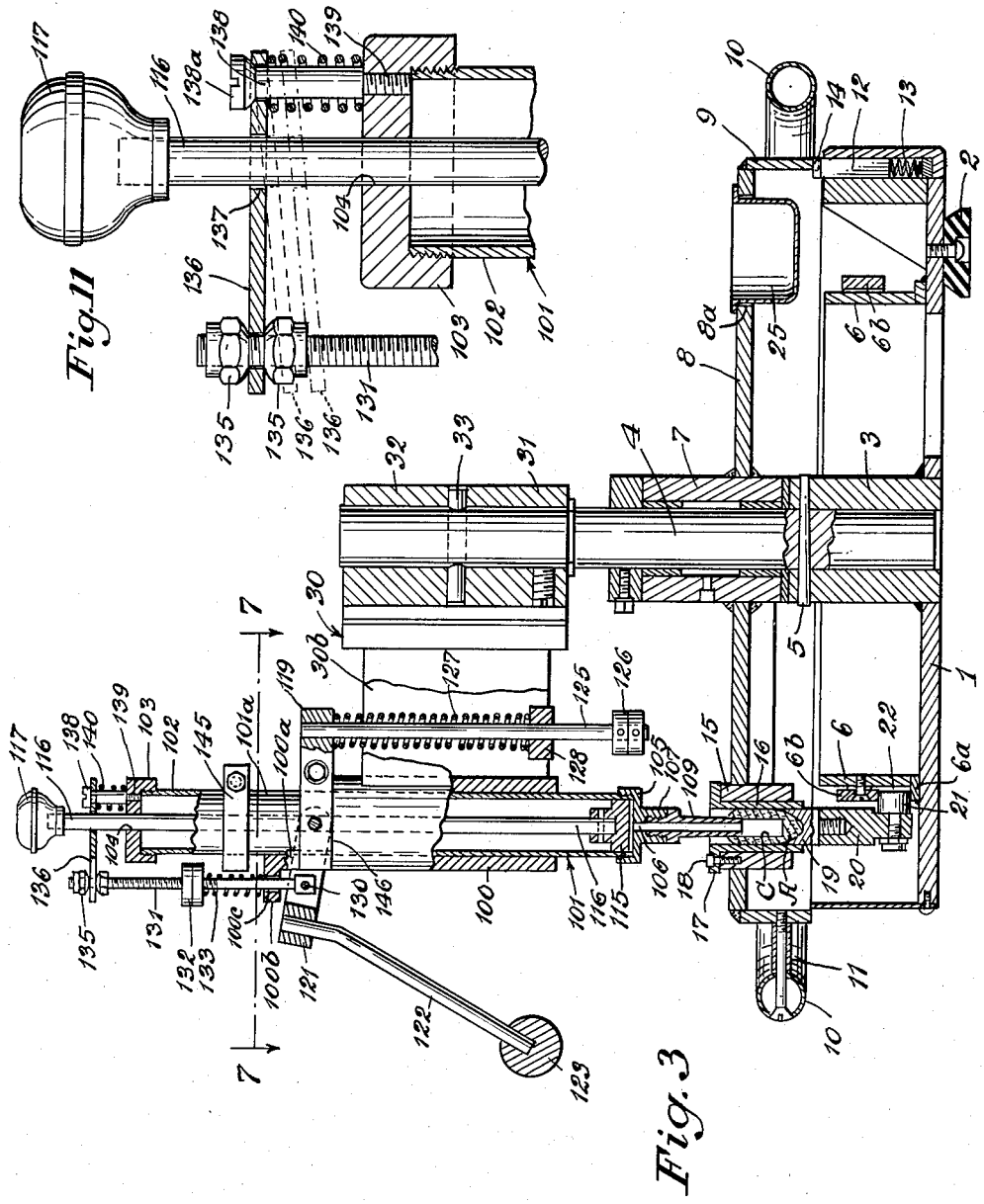

2,991,813
PITTING AND STUFFING MACHINE
Carl A. Wilms, Park Ridge, Ill., assignor to John W. Leslie, Chicago, Ill.
Filed May 31, 1956, Ser. No. 588,307
11 Claims. (Cl. 146—17)

This invention relates to an improvement in pitting machines and methods, and has for one purpose to provide a method and apparatus which can be efficiently employed in pitting fruit.

Another purpose is to provide a pitting method and machine, particularly effective in removing pits from dates.

Another purpose is to provide a method and apparatus for removing pits and undesirable matter from fruit, including dates, and for thereafter delivering to the interior of the fruit a filling to fill the space so provided.

Another purpose is to provide an improved method and apparatus for removing pits from the end of the fruit, such as dates, while aperturing one end only of the fruit.

Another purpose is to provide a method and apparatus for treating a variety of agricultural products and particularly for forming stuffed products.

Other purposes will appear from time to time in the course of the specification and claims.

The invention is indicated more or less diagrammatically in the accompanying drawings, wherein—

FIGURE 3 is a section on the line 3—3 of FIGURE 1;

FIGURE 4 is an enlarged partial vertical section of the structure shown in FIGURE 2;

FIGURE 5 is a partial vertical section with the parts in a different position;

FIGURE 6 is a section on the line 6—6 of FIGURE 4;

FIGURE 7 is an enlarged section on the line 7—7 of FIGURE 3;

FIGURE 8 is a partial section, on a somewhat enlarged scale of the structure shown in FIGURE 3, with the parts in a different position;

FIGURE 9 is a similar partial section with the parts in a still different position; and FIGURE 10 is a section on the line 10—10 of FIGURE 9.

FIGURE 11 is an enlarged section of a portion of FIGURE 3.

Like parts are indicated by like symbols throughout the specification and drawings.

Figure 1:
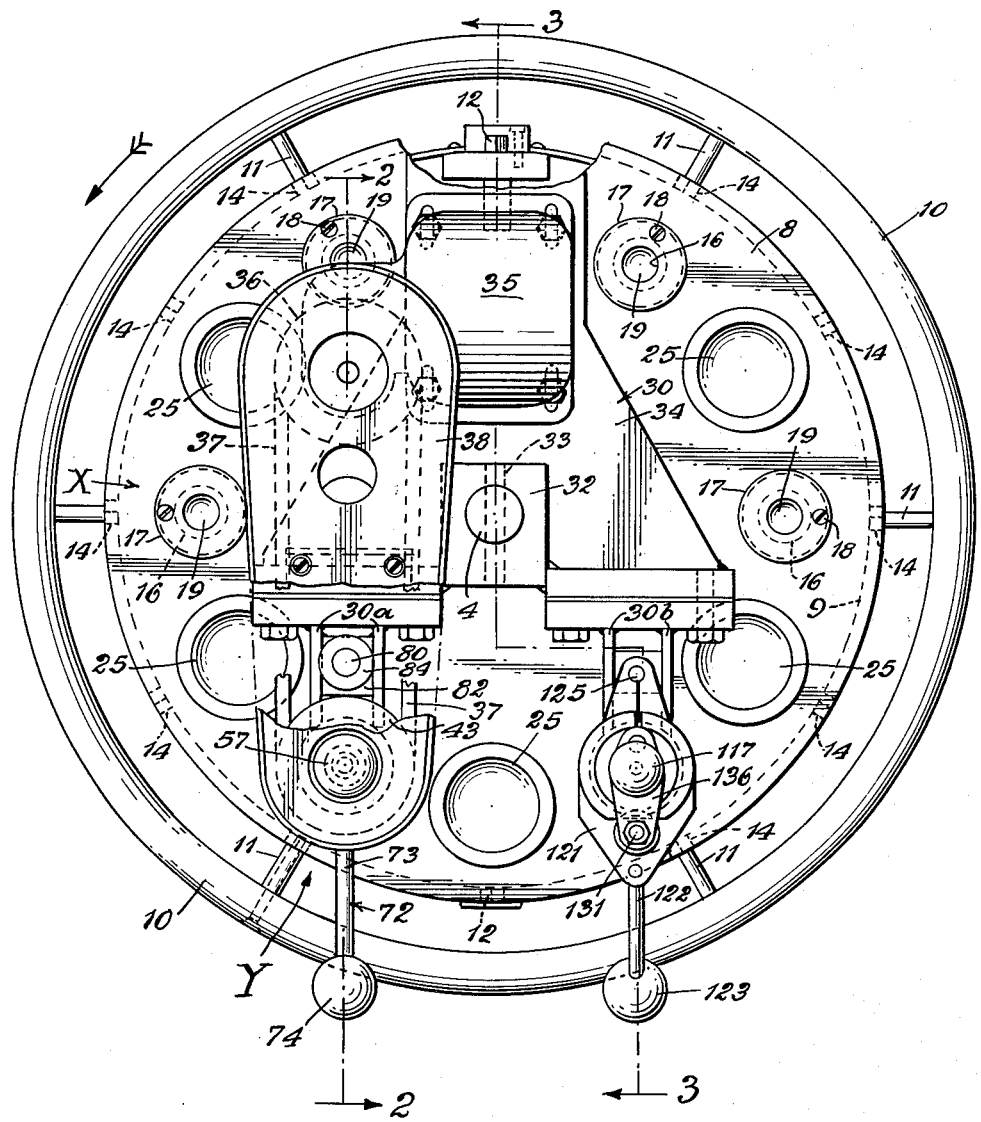
FIGURE 1 is a plan view of a mechanism embodying my invention.

Referring to the drawings, an embodiment of the invention is illustrated in which a movable frame or sub-base is rotated about a vertical axis on a fixed support or base, in order to move the fruit or object being treated sequentially past a series of operating stations. This disclosure is to be taken as illustrative inasmuch as other mechanisms may be used for moving the articles worked past a series of operating stations or operating zones.

Considering the specific structure shown, 1 generally indicates a base plate which may be supported on any suitable supporting surface, for example, by several anti-vibrational yielding pads or supports, of which one is shown at 2 in FIGURE 3. The details of the fixed structure may be widely varied, but, in FIGURE 3, a fixed hub 3 is shown in which a fixed vertical bearing post 4 is mounted and held, for example, by any suitable locking pin 5. Concentric with the hub 3 is a circumferential cylindrical member 6, the purpose of which will appear later. Rotatable about the fixed post 4 is a sleeve 7, which supports a top plate or table 8 having a downwardly extending circumferential rim or flange 9.

10 indicates suitable handle means, herein shown as a handle ring, mounted on the rim 9 by any suitable supporting members or screws and sleeves 11. The operator, by the use of the handle ring 10, can rotate the sleeve 7 and the top plate 8 about the vertical post 4. It will be understood that whereas the drawings show a manual, rotatable member, it is within the bounds of the invention to provide any suitable mechanical or powered driving means. In the particular embodiment shown, it will be understood that the top plate 8 and the parts carried thereby may conveniently be rotated manually about the vertical axis of the post 4 by a step-by-step movement, a suitable detent or detents, being shown, as indicated at 12 in FIGURE 3. Each such detent may be yieldingly upwardly thrust, for example, by a spring 13 against a suitable receiving notch 14 in the lower edge of the flange or rim 9. Thus the operator may conveniently rotate the top plate or sub-frame 8 about its axis a desired number of steps, the engagement of the detent or detents 12 with a suitable notch or notches 14 being a convenient arrangement for holding the top plate 8 at a predetermined position after it has been rotated through a desired number of steps.

Assuming that the structure is to be used for pitting, and, thereafter, stuffing dates, or fruits of similar size and shape, the top plate 8 may carry a sequence of date receiving members. Referring, for example to FIGURE 3, the plate 8 is apertured to receive outer sleeves 15, in each of which is positioned an upwardly flanged inner sleeve 16, the upper outer flange 17 of which is suitably secured to the sleeve 15, for example, by screws 18. The sleeve 16 is of appropriate diameter to receive a date or other fruit or object to be treated. The aperture of the sleeve 16 is cylindrical, and is open at the bottom. Extending upwardly into it is a piston or fruit supporting and receiving member 19 of a suitable material, preferably non-metallic, the upper end of which may be contoured to form a seat for a product to be cavitated. The member 19 is supported and actuated by a block 20 carrying a roller 21. The sleeve 16 and product supporting element 19 form, in effect a recess for the reception of a product to be cavitated. The roller 21 rides in a slot or track 22 formed by a lower, outer flange of the ring 6a, and a confining upper member or ring 6b. It will be understood that the slot 22 thus formed normally keeps the roller 21, and thus the product supporting element or member 19, in a predetermined position near the bottom of the sleeve 16. The product supporting assembly heretofore described is therefore movable with the top plate 8.

As will later appear, the fruit, after a sequence of steps, is upwardly ejected from the top of the sleeve 16. This ejection may automatically result, at a desired point, in the rotation of the plate 8, by the cam structure indicated in FIGURE 10. The lower cam member 23 raises the roller 21 in response to the rotation of the plate 8. Opposite the cam 23 the ring 6b is broken away, and the upper or defining cam member 24 defines, with the cam 23, upwardly inclined camming sections 22a of the slot 22, the sections 22a being connected at their opposed upper ends by a short horizontal slot portion 22b. Thus, in response to the rotation of the plate 8, the support 19, in response to the operation of the cam structure of FIGURE 10, at a desired point in the rotation of the plate 8, moves upwardly through the sleeve 16 and ejects the fruit. Whereas the drawings shown only a single cam member, or a single point at which the fruit is ejected, it will be understood that, if desired, more than one camming station may be employed, where more than one ejection point is needed. For example, on a larger rotary machine or where other means are substituted for the rotating plate 8, a plurality of ejection points may be used, In the structure as shown in plan view in FIGURE 1, there are six of the sleeves 15, of which two are concealed beneath working heads, which will later be described. FIGURE 1 also illustrates six pit-receiving containers 25, one of which is shown in section in FIGURE 3. These cavitated material containers are illustrated as readily removable upwardly open cans or receivers which extend into suitable holes 8a in the plate 8, and are available to receive pits after their removal from the fruit.

Figure 2:
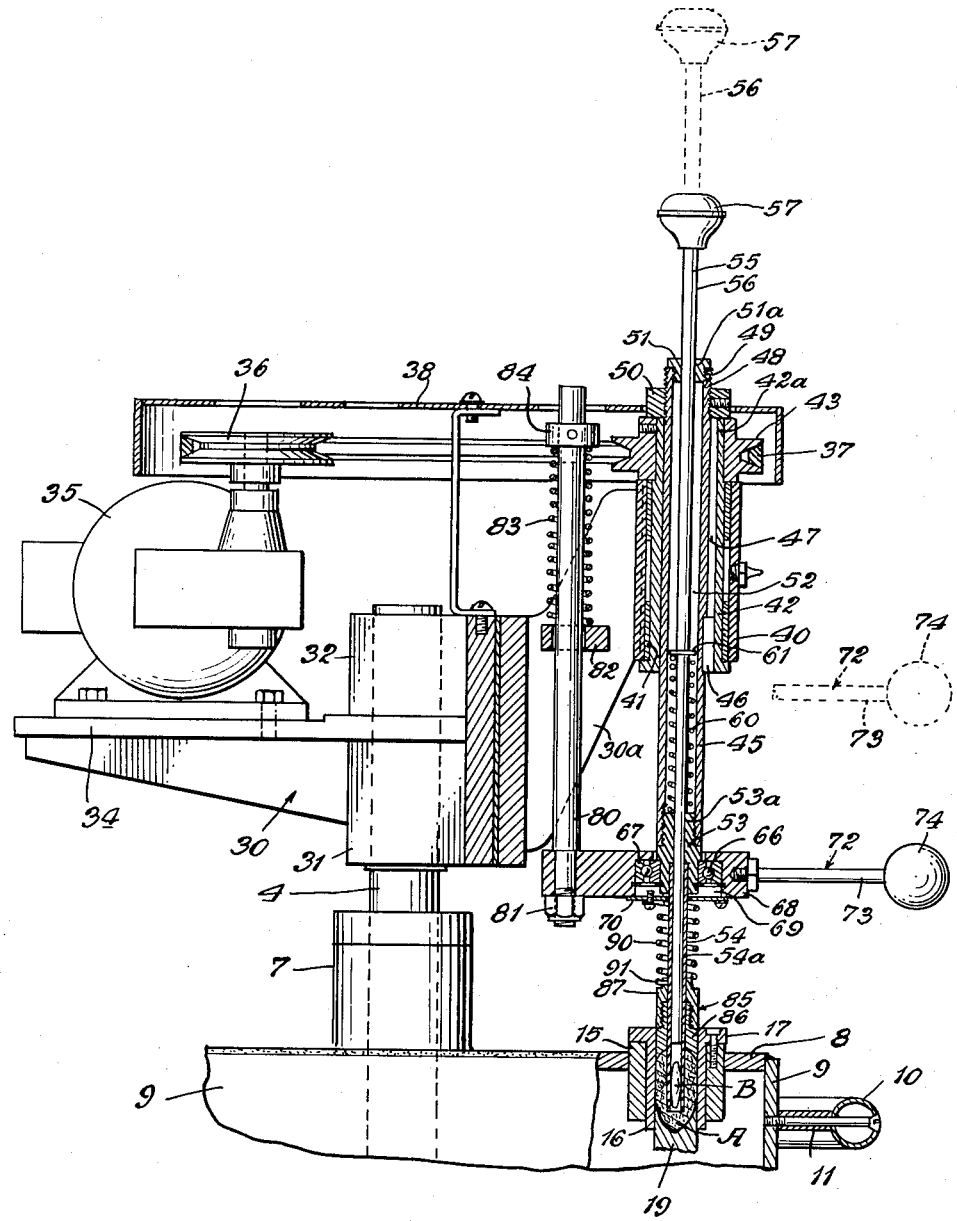
FIGURE 2 is a section on the line 2—2 of FIGURE 1.

Let us assume that, in the use of the structure of FIGURES 1, 2 and 3, either an operator, or an appropriate mechanism, positions a date in the particular sleeve 15, 16 shown at station X. The machine may then be indexed forward, counterclockwise, as the parts are shown in FIGURE 1, to carry such date to the station indicated at Y in FIGURE 1, the position of the parts being as shown in section in FIGURE 2. This brings the date beneath an initial operating structure, which will now be described.

Mounted on the fixed central post 4 is a frame 30. It may be secured to the post, for example, by sleeves 31, 32 and any suitable set screws or other securing means 33. The frame includes a base 34 upon which is mounted any suitable motor 35, the details of which form no part of the present invention. It will be understood that the motor drives a pulley 36, as shown, for example, in FIGURE 2. The frame 30 includes a support 30a which carries a cylinder or mounting sleeve 40.

Rotatably mounted within a sleeve bearing 41 in the sleeve 40 is a hollow shaft 42. A pulley 43 is secured to the upwardly extending portion 42a of shaft 42 and positioned to be driven by means such as the endless V-belt 37, driven in turn by the pulley 36. 38 is a cover or housing for the pulleys 36, 43 and belt 37.

Mounted for reciprocal movement within and for rotation with the sleeve 42 is an operating member or arm 45. A key 46 serves to join the members 42, 45 for rotation together and the key 46 is slidably received in an elongated slot 47 in the inner circumferential surface of the shaft or hollow cylindrical member 42. An upper portion 48 may carry, as by means of the threads 49, an annular block 50 serving as a stop means to limit the movement of the member 45 outwardly from the shaft 42 or downwardly as the parts are shown in FIGURE 2. A centrally apertured closure 51 may be threadably engaged with the upper portion 48 and may serve partially to close the axial opening 52 which extends throughout the member 45. At its opposite end the member 45 carries a centrally apertured closure or end member 53. A hollow tubular knife or pitting member 54 is carried by the member 53 in axial alignment with the hollow member 45, the member 54 extending outwardly from the closure 53 or downwardly as the parts are shown in FIGURE 2. Mounted for reciprocation within the axially aligned apertures 51a in the closure 51, 52 in the member 45, 53a in the closure 53 and 54a in the pitting member 54 is an ejector member 55 which may comprise a rod 56 extending from above the upper portion 48 through the member 45 and into the member 54. A handle element 57 is carried by the upwardly or outwardly extending portion of the rod or piston member 56. Yielding means 60, which may comprise a spring, surrounds a portion of the rod 56 within the member 45 and has its opposite ends in engagement with the inner annular surface of the closure 53 and a retaining ring or flange 61 secured to the rod 56 and extending annularly therefrom.

The member 53 is received within an aperture 64 formed in a block 68 and may carry the inner race 65 of a ball bearing structure 66, the outer race 67 thereof being carried by the operating block 68. A well 69 formed in the block 68 receives the ball bearing structure 66 and may be covered by a centrally apertured cover plate 70 having an aperture 71 through which the knife 54 extends. Extending outwardly from the block 68 and laterally of the member 45 is a manually operable means 72 comprising a rod 73 and a handle means 74. On the opposite side of the member 45 from the operating means 72, the block 68 receives and engages a tension member or rod 80 which may, for example, be secured to the block 68 by securing means 81. The rod 80 generally parallels the member 45 and piston 56 and is slidably received in an apertured retaining element 82. A yielding means 83 surrounds the rod 80 above the element 82 and engages, at its opposite ends, the upper surface, as the parts are shown in the drawings, of the element 82 and the lower surface of a spring-retaining element 84 secured adjacent the upper end of the rod 80.

The pitting means 54 has its outwardly extending portion rotatably and slidably received in a date or fruit positioning or holding member generally indicated by the numeral 85. The member 85 may comprise a centrally apertured holding element 86 and a centrally apertured nut element 87 threadably engaged with the member 86. The outwardly or downwardly directed face or surface of the member 86 may be generally concave, surrounding the central aperture 86a therein for purposes which will appear hereinbelow. Yielding pressure means 90 may surround the pitting member 54 outwardly of the plate 70 and may have its opposite ends in engagement with the outer surface of the plate 70 and the upper surface of the member 87, the member 87 being joined to the spring or yielding means 90 as indicated generally at 91 to retain the holding element 85 slidably in position on the knife 54 and to permit simultaneous reciprocal and rotary movement of the knife 54 within the aperture 86a of the member 86 and the aperture 87a of the member 87.

Referring now particularly to FIGURES 1, 3 and 8–10, I illustrate stuffing means for dates, fruit and the like, the frame 30 having an outwardly or laterally extending support 30b, an outer portion of which may be secured to a hollow fixed cylinder-supporting member 100. The member 100 has mounted for axial reciprocation therewithin a cylinder 101. The cylinder 101 carries at its upper end 102 a cap or closure 103 having a central aperture 104 therein. At its opposite end the cylinder 101 carries a cap or closure 105 having the central passage 106 therein. The passage 106 may be outwardly expanded as at 107 and the expanded portion may carry, as by means of threads 108, the injector nozzle member 109 having a tapered outer surface 111 and a central passage 110 therein in axial alignment with the passage 106.

Mounted for reciprocal movement within the cylinder 101 is a piston member 115 to which a piston rod 116 is connected, the rod 116 extending upwardly or outwardly through the aperture or passage 104 in the closure 103 and carrying at its upper or outer end the handle means 117.

The upper portion 101a of the cylinder 101 carries a laterally extending bracket 119. Pivotally mounted, as at 120, to the bracket 119 is an operating yoke and handle means comprising a rod 122 and a manually operable outer element 123. The bracket 119 carries a downwardly depending rod element 125 which extends through the support 30b and which carries at its outer or lower end a comparably massive element 126. A yielding means 127 surrounds the rod 126 and has its opposite ends in engagement with a lower surface of the bracket 119 and the supper surface of a fixed ring 128 secured to the support 30b.

The yoke 121 pivotally carries a cross pin element 130 to which is pivotally connected an upstanding rod element 131. The support 100 has an upwardly extending portion 100a from which an ear 100b extends laterally above the yoke 121 and pin 130, the rod 131 extending through an aperture 100c formed in the ear 100b. A spring-retaining element 132 surrounds and is secured to the rod 131 above the ear 100b and yielding means 133 surrounds the rod 131 and has its opposite ends in engagement with the element 132 and ear 100b.

The rod 131 carries at its upper end a set of spaced securing elements 135 having convex opposed surfaces in tiltable engagement with a clutch element 136. The element 136 may, for example, comprise a plate having an aperture 137 through which extends the upper portion of the rod 116. A securing element 138 may be connected as at 139 to the cover 103 from which it upwardly extends. The plate 136 has an aperture in relatively loose engagement with the pin 138 and yielding means 140 may surround the pin 138 between the plate 136 and cover 103 to urge the plate 136 upwardly against the lower surface of a head 138a on the pin 138.

A stop ring 145 may be clamped securely about the upper portion 101a of the cylinder 101 to provide abutting engagement by the element 132 and thus to limit the downward movement of the rod 131, as will be described hereinbelow. Similarly, an upper edge 146 of the cylinder support 100 provides a stop means to limit the movement of the cylinder 101 and thus to limit the movement of the injector nozzle 109 toward operative position.

It will be realized that whereas I have described and illustrated a practical and operative device, nevertheless, many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of my invention are as follows:

I provide a means and method for treating dates, fruit and similar agricultural products with particular relation to the pitting and stuffing thereof, the method of my invention being described in greater detail hereinbelow. While the particular embodiment disclosed in the drawings filed herewith is effective, it will be understood that variations may be made without departing from the nature and scope of my invention. For example, the method of my invention may be carried out by a step-by-step process or it may be employed in a continuous sequence. Similarly, while the drawings illustrate operation upon a single date, it is clear that a plurality of agricultural products may be treated at each station and, when such is the case, different operations may be performed at each station. Further, as mentioned above, the apparatus disclosed herein is arranged for manual operation, whereas it is clear that each of the manually operable elements disclosed may be suitably operated by a wide variety of automatic mechanical or electrical devices without departing from the nature and scope of my invention. In addition, the circular rotatable table 8 may be substituted for by a continuous conveyor belt or a reciprocating surface and, of course, the horizontally positioned table 8 could be operated in a vertical plane with the receiver members positioned on the periphery thereof and the number of such containers and treating stations may be widely varied, all within the nature and scope of my invention as set forth in the appended claims.

Referring now to the particular embodiment disclosed in the drawings hereof, and particularly first to FIGURE 2, it will be clear that the item to be treated, for example the date A, is first positioned within the socket or receiver formed by the sleeve 16 and ejection member 19. The members 16, 19 may, for convenience, be considered as a type of "chuck." The rotating hollow pitting tool 54 then moves downwardly to penetrate the date A a suitable distance, for example to the depth illustrated in FIGURE 2, the beveled cutting edge 54b making a neat opening in the skin of the product A. The selected depth of penetration of the knife 54 may be predetermined by adjustment of the stop ring 50 illustrated in FIGURE 2. The pit remover 54 not only forms a circular cut in the product A, but surrounds the pit and any undesired "rag content" within the product as well as that portion of the product above the pit or between the pit and the approaching knife 54. Similarly, the pitter and stuffer may be sequentially moved into position of alignment with a stationary date holder and pit cup. The tool 54 then raises upwardly, or withdraws from the date A and the pit B, rag content and fruit portion, now positioned within the hollow knife or tool 54 are removed from the date as the element 54 is withdrawn, leaving a well or cavity C in the product.

As indicated, when the device shown in the drawings is used in treating dates and similar products certain undesirable constituents, commonly known as "rag content," are likewise removed along with the pit. It will be observed that the tool 54 does not penetrate the entire product A, but its depth of penetration is limited to that necessary to remove the pit and any other undesirable material. I find it advantageous, for example, in relation to dates, to have the tool 54 penetrate to that depth necessary to bring the outer cutting edge of the tool to the approximate level of the lowermost edge of the pit, when the device is operated in the position shown in the drawings.

It should be observed that the holding or holder element 86, when the tool 54 initially approached the date A, was brought into non-rotating contact with the upper surface of the date. Continued downward movement, for example of the handle element 74, was thereafter effective to cause the rotating knife 54 to penetrate the date as above described and at the same time, through the spring 90 and nut 87, to maintain a steady holding pressure of the element 86 upon the date. Similarly, as the tool 54 was withdrawn from the date A, pressure of the element 86 on the date was only gradually relieved and continued upward movement of the handle means 74 is effective to remove the tool 54 and element 85 from the chuck 16, 19.

As illustrated in FIGURE 5, the table 8 may then be moved to bring the pit receiver member 25 into position beneath the knife 54.

As earlier described, with the structure shown in the drawings, the detent members 12, 14 are so positioned as to cause resistance to movement of the table 8 at the points at which the individual chucks 16, 19 and pit cups 25 are aligned with the treating stations occupied by the pitting structure illustrated in FIGURE 2 and the stuffing structure illustrated in FIGURE 3. With the pit receiver 25 aligned with the knife 54, the ejector rod or piston 56 having an end reciprocally mounted within the hollow knife 54, is moved through the knife, or downwardly as the parts are shown, to eject the pit and to cause it to enter the pit receiver.

It will be understood that continued movement of the table 8 will position at a stuffing station and will align with the stuffing mechanism illustrated in FIGURE 3, a chuck 16, 19 having therewithin a date A with an upwardly open well or cavity C, produced as above described at the pitting station shown in FIGURE 2. As above indicated, the detents 12, 14 are effective to index the table 8 at certain specific stops or points so as to align the desired element with the pitter or stuffer with each movement of the table 8. While the pitter and stuffer mechanisms and stations are shown as fixed necessitating stopping of table 8 at each station while an operation is conducted it will be understood that these mechanisms could move with the table, as necessary, to perform each operation during such movement to avoid intermittent movement of the table.

With the well or cavity C presented to the stuffer mechanism shown in FIGURE 3, double-acting handle means 123 may then be moved. Initial movement of the handle 123 moves the cylinder 101 and the attached nozzle 109 against the action of spring 127 to position the tip or end of the nozzle within the cavity C. As illustrated in FIGURE 8, the cylinder 101 contains a quantity of stuffing material D. The bracket 119 is positioned on the cylinder 101 so as to abut an upper edge of the cylinder support 100 and thus to limit the movement of the cylinder 101 at the desired depth of penetration of the nozzle into the cavity C. Thereafter, and only thereafter, continued movement of the handle 123 is effective to cause endwise movement of the rod 131 against the action of the spring 133. The tilting connection of the rod 131 with the clutch plate or element 136 is such as to move the plate 136 into a plane inclined from that occupied by the piston rod 116 and thus to bring the edges of the plate aperture 137 into clutching engagement with the rod 116. Further movement of the handle 123 thus causes the plate 136 and the rod 116, with which it is now engaged, to move against the action of the springs 133 and 140 and to cause piston 115 to move against the stuffing material. The stop ring 125 is selectively positioned on the cylinder 101 to be contacted by the element 132 on the rod 131 when the piston rod 116, and consequently the piston 115, has been moved sufficiently to inject the predetermined desired quantity of stuffing material D through the nozzle 109 into the cavity C of the date A.

In FIGURE 3, the cylinder 101 is shown as almost completely exhausted of stuffing material. It will be understood, however, that the clutch means 136, as above described, is effective to progressively move the rod 116 and piston 115 from their uppermost position to their lowermost position as a result of a plurality of separate operations of the handle 123. That is to say that release of the handle 123 causes the plate 136 to return to the position illustrated in FIGURE 3 while allowing the rod 116 and piston 115 to remain in the position to which it had been urged in response to the last movement of the handle 123. Thus is provided a clutching action in which the plate 136 is enabled to engage the rod 116 at a plurality of points therealong to progressively move the piston 115 through the cylinder 101 during repeated operations of the stuffer mechanism illustrated in FIGURE 3. Cylinder 101 may be refilled by any suitable means and handle 117 is provided for returning piston 115 to the upper limit of its travel prior to refilling of the cylinder. The stuffing gun is moved to withdraw the nozzle 109 from the sleeve 16. The table 8 is then moved again, causing movement of the cam 21 along the track 22 which is co-extensive with the path of movement of chucks 16, 19 and cups 25. As illustrated in FIGURE 10, the track 22 has a raised portion illustrated at 22a, 22b and as the cam 21 negotiates the track at this point, it is caused to rise and thus to move the slidably mounted support and ejector 19, to which it is secured, upwardly within the sleeve 16, as best seen in FIGURE 9, to eject the stuffed date A. As movement of the table 8 continues and the cam 21 descends from the position shown in FIGURE 10, the element 19 is retracted and repositioned to again receive and support an untreated date. While loading, pitting and stuffing stations are illustrated, a cleaning station may also be provided without departing from my invention.

It will be understood that the substitution of automatic powered means for manually operable means, as described above, may employ a series of cam movements such as that immediately described or other means to cause movement or reciprocation of all of the elements of my invention in sequence, along with a simultaneous continous movement of the product supporting and discard receiving member 8.

Thus is produced, as illustrated in FIGURE 9, an attractive and completed stuffed product having its surface broken only at one end and a well-filled or stuffed cavity closed by the unbroken surface of the fruit at its opposite end.

Thus may be described one mechanism by which the method of my invention may be carried out. The product to be treated, or the date to be stuffed, is positioned in a holder. The holder is positioned at a pitting station and in alignment with a pit-extracting or cavity-forming tool. The product is then placed under pressure and a circular or cylindrical cut is then formed in the product while maintaining the product under pressure and the material occupying the area within the cylindrical cut is withdrawn from the product while the product is held within the holder to form a cavity in the product having one open end and interrupting the surface of the product at one point only.

The pit or removed material may be ejected from the cavity-forming device or pitter and discarded. The cavitated product is positioned at a stuffing or loading station and a predetermined quantity of stuffing material is injected under pressure into said cavity to completely fill the cavity and the product with its stuffed cavity is thereafter removed or ejected from the holder. Thus a plurality of date products, for example, may be prepared by repetitiously positioning each date in a holder, forming a cavity in each date by withdrawing material therefrom and through one end thereof discarding the material and stuffing the cavity so formed with a preselected stuffing material and ejecting or removing the stuffed or finished product from the holder.

I claim:

1. In a treating device for an agricultural product, a base, a plate movably mounted on said base, a plurality of product supporting members on said plate, a plurality of refuse receiving containers mounted on said plate, a cavity-forming mechanism supported on said base, said mechanism comprising a support, a cavity-forming tool mounted for simultaneous reciprocation and rotation on said support, means for moving said tool toward and away from said plate, means for rotating said tool, an ejector element mounted for reciprocation on said support and positioned to eject therefrom refuse removed from said product by said tool, said refuse container being movable with said plate into position to receive said refuse from said cavity-forming tool, a stuffing mechanism mounted on said base, said stuffing mechanism comprising a support, a cylinder mounted for reciprocation on said support toward and away from said plate, a piston mounted for reciprocation within said cylinder, a nozzle carried by said cylinder and having a passage therethrough in communication with the interior of said cylinder, said cylinder reciprocating means including a clutch mechanism engageable with said piston whereby initial movement of said cylinder reciprocating means is effective to move said cylinder and nozzle towards said plate and continued movement of said cylinder reciprocating means is effective to move said piston within said cylinder toward said nozzle to deliver stuffing material through said nozzle passage under pressure, said continued movement of said cylinder reciprocating means being effective to move said piston within said cylinder a predetermined distance sufficient to eject from said nozzle stuffing material in a quantity sufficient to fill the cavity formed by said cavity-forming mechanism.

2. The structure of claim 1 characterized by and including a track on said base, said track being coextensive with the path of movement of said plate, and wherein said product supporting member comprises a sleeve, a product-expelling element slidably mounted within said sleeve adjacent one end thereof, a track follower carried by said expelling element and movable along said track in response to movement of said plate, said track having offset portions effective to move said follower toward said sleeve and thereby to move said expelling element through said sleeve toward its opposite end.

3. In a treating mechanism for an agricultural product or the like, a base, a support mounted on said base, a plurality of chuck elements carried by said support, each of said chuck elements comprising a sleeve having an open end and a product-supporting element reciprocally mounted within said sleeve and normally positioned adjacent its opposite end, a cavity forming device rotatably and reciprocally mounted adjacent said support, a cavity stuffing device mounted adjacent said support, a plurality of refuse-receiving containers on said support, means for sequentially positioning said product supporting members and said refuse receiving containers in alignment with said cavity forming device and for positioning said product supporting members in alignment with said cavity stuffing mechanism, means for moving said cavity forming device and said product holding members toward and away from each other, means for moving said cavity stuffing device and said product holding members toward and away from each other and means for moving said product supporting element through said sleeve towards said open end, said cavity stuffing device being formed and adapted to eject a quantity of stuffing material sufficient to fill the cavity formed by said cavity-forming device.

4. In a treating device for agricultural products, a base, a plate movably mounted on said base, a plurality of product holding members and pit receiving members alternately positioned on and carried by said plate, a pitting mechanism mounted on said base, a stuffing mechanism mounted on said base, detent mechanism associated with said plate and said base and positioned to impede the movement of said plate at those points at which one of said members is positioned in alignment with one of said mechanisms, said pitting mechanism being formed and adapted to create a cavity in a product held in one of said product-holding members, said stuffing mechanism being formed and adapted to enter said cavity.

5. In a treating device for agricultural products, a base, a plate movably mounted on said base, a plurality of product-holding members, and pit-receiving members alternately positioned on and carried by said plate, a pitting and cavity-forming mechanism mounted on said base, a stuffing mechanism mounted on said base, detent mechanism associated with said plate and said base and positioned to impede the movement of said plate at those points at which one of said members is positioned in alignment with one of said mechanisms, said pitting and cavity-forming mechanism being mounted for simultaneous rotation and reciprocal movement toward and away from said product-holding member, means limiting movement of said pitting and cavity-forming mechanism toward said holder to a distance sufficient to cause penetration of said holding member to a depth less than the depth of a product held by said holding member, said stuffing mechanism including an injector nozzle having an outer diameter substantially equal to the inner diameter of the cavity formed by said pitting and cavity-forming mechanism.

6. In a device for forming closed end cavities in agricultural products such as dates or the like, the combination of means for confining an agricultural product while it is being cavitated, said confining means including a structure having substantially vertical sides which form an elongated, substantially vertically oriented recess, a substantially hollow, generally tubular knife having a cutting edge on its forward end, means for rotating said knife, means for advancing said knife while it rotates along a predetermined path into an agricultural product positioned in the recess, stop means operatively associated with the knife advancing means for halting the knife short of penetration completely through the agricultural product, means for retracting said knife from the agricultural product with the cavitated material, and an ejector mounted within the knife for reciprocable movement toward and away from the cutting end, said ejector being effective to dislodge cavitated material retained by said knife after a cavity forming operation.

7. The combination of claim 6 further characterized by and including restraining means for exerting a restraining force on the agricultural product as it is being cavitated, said restraining means including a holding member operatively associated with the knife and confining means and mounted to move, in coordination with movement of the generally tubular knife, into a position in which it engages the agricultural product whereby movement of the product is restrained while the knife is in engagement with the product.

8. The closed end cavity forming device of claim 6 further characterized by and including means for varying the length of the path of travel of the knife to thereby vary the depth of cavity.

9. A mechanism for processing agricultural products and the like, said mechanism including, in combination, a base, a support structure, said base and support structure being movable with respect to one another, at least one product supporting assembly movable with said support assembly, said product supporting assembly being constructed and arranged to form a recess for the reception of a product to be cavitated, a rotatable and reciprocal cavity forming device mounted for alignment with the product supporting assembly in at least one position of the base with respect to the supporting structure, a cavity stuffing device mounted for alignment with the product supporting assembly in at least one position of the base with respect to the supporting structure, at least one cavitated material receiving container mounted to receive cavitated material from the cavity forming device intermediate the product supporting assembly and the cavity stuffing device, means for moving the cavity stuffing device and the product supporting assembly toward and away from one another, said cavity stuffing device being formed and adapted to eject a quantity of stuffing material sufficient to fill the cavity formed by said cavity-forming device.

10. The agricultural product processing mechanism of claim 9 further characterized in that the product supporting assembly comprises a generally cylindrical sleeve having an open end and a supporting assembly comprising a product supporting element reciprocably mounted within said sleeve and normally positioned adjacent the opposite end, and means for moving the product supporting element through the sleeve towards the open end at the conclusion of a series of treatment steps on a product.

11. The agricultural product processing mechanism of claim 9 further characterized in that the product supporting element is contoured to form a seat for a product to be cavitated.

References Cited in the file of this patent

UNITED STATES PATENTS

| | | |
|---|---|---|
| 71,069 | Russell | Nov. 19, 1867 |
| 482,327 | Adams | Sept. 6, 1892 |
| 716,331 | Brown | Dec. 16, 1902 |
| 1,133,054 | Newcomb | Mar. 23, 1915 |
| 1,392,520 | Parenteau | Oct. 4, 1921 |
| 1,476,937 | Walden | Dec. 11, 1923 |
| 1,522,944 | Cook | Jan. 13, 1925 |
| 1,982,779 | Ayars | Dec. 4, 1934 |
| 2,283,714 | Wolff | May 19, 1942 |
| 2,351,788 | Smith | June 20, 1944 |
| 2,359,881 | Serr | Oct. 10, 1944 |
| 2,406,736 | Ashlock | Sept. 3, 1946 |
| 2,433,125 | Kane | Dec. 23, 1947 |
| 2,681,089 | Francisco | June 15, 1954 |
| 2,740,440 | Wright | Apr. 3, 1956 |